United States Patent [19]

Ih

[11] Patent Number: 4,776,652

[45] Date of Patent: Oct. 11, 1988

[54] OPTICAL HEAD HAVING TWO HOLOGRAPHIC OPTICAL ELEMENTS, WITH ONE ELEMENT INCLINED RELATIVE TO THE OTHER

[75] Inventor: Charles S. Ih, Newark, Del.

[73] Assignee: Camber Corporation, Woburn, Mass.

[21] Appl. No.: 103,370

[22] Filed: Oct. 1, 1987

[51] Int. Cl.$^4$ .............................................. G02B 5/32
[52] U.S. Cl. ................................... 350/3.72; 350/3.7
[58] Field of Search ................................ 350/3.7–3.72

[56] References Cited

U.S. PATENT DOCUMENTS

| 4,253,723 | 3/1981 | Kojima | 350/3.71 |
| 4,428,643 | 1/1984 | Kay | 350/3.71 |
| 4,497,534 | 2/1985 | Sincerbox | 350/3.72 |

*Primary Examiner*—Bruce Y. Arnold
*Attorney, Agent, or Firm*—Joseph S. Iandiorio; Douglas E. Denninger

[57] ABSTRACT

A holographic head including a collimating element for receiving a coherent beam of radiation non-circular in cross section, an objective element for receiving a radiation beam and focusing it to a spot, and a holographic unit also disposed in the path of the beam. The holographic unit includes a first hologram element for passing the beam at a predetermined diffractive order and sign. The holographic unit further includes a second hologram element inclined at an angle to the first hologram element for providing a beam substantially circular in cross section and at the same diffractive order and opposite sign to compensate for dispersion. The first and second holograms may additionally compensate for collimating or objective element aberrations, respectively.

25 Claims, 4 Drawing Sheets 4,776,652

OPTICAL HEAD HAVING TWO HOLOGRAPHIC OPTICAL ELEMENTS, WITH ONE ELEMENT INCLINED RELATIVE TO THE OTHER

FIELD OF INVENTION

This invention relates to an optical head, and more particularly to such a head having a holographic unit which compensates for variations in beam wavelength and, in addition, corrects laser beam ellipticity.

BACKGROUND OF INVENTION

Optical recording serves an important role in information storage. Information density is many times greater for optical recording than comparable magnetic recording and offers longer life and higher speed for reading and writing information. It also has the potential for decreased cost. Presently, however, the average access speed of optical disk drives are low and the cost high in comparison to magnetic media, due largely to the bulk and high cost of the optical read/write head.

Conventional optical read/write heads typically contain a number of glass lenses, a semiconductor laser whose output beam is elliptical in cross section, and, frequently, beam shaping elements. The read/write heads are very complex, heavy, and relatively slow to position. The glass lenses afford high-quality imaging, however, by accurately shaping and collimating the laser beam. Further, the glass lenses provide a good wave front for the beam, and remain relatively insensitive to changes in wavelength of the beam.

Holograms have been used to replace one or more optical elements in read/write heads. In theory, all lenses could be replaced by a single hologram. However, holograms are extremely sensitive to wavelength shifts and use of a single hologram is therefore impractical.

One system utilizes two holograms to replace several optical elements. The holograms are parallel to each other and are arranged to diffract light by opposing orders, e.g., first by $-1.0$ order and then by $+1.0$ order. Certain deviations such as wavelength shifts are largely cancelled by use of opposing diffraction orders. However, this system does not correct the beam shape. Therefore, beam shaping optics, typically a pair of prisms, must be added to the system to shape the beam. This is very difficult to accomplish while maintaining compactness. Beam shaping is important because masking the elliptical portion of the beam wastes a great deal of radiation. Masking an elliptical beam results in the loss of a great deal of beam power, which loss is acceptable for audio compact disk applications but unacceptable for writing optical disks utilized in computer applications.

SUMMARY OF INVENTION

It is therefore an object of this invention to provide an improved holographic head which corrects beam shape in addition to providing dispersion compensation.

It is a further object of this invention to provide such a holographic head which conserves beam energy while correcting beam shape.

It is a further object of this invention to provide such a holographic head which accepts a quasi-coherent beam non-circular in cross section and emits a beam substantially circular in cross section.

Yet another object of this invention is to provide such a holographic head which is more rugged than conventional optical heads.

It is a further object of this invention to provide such a holographic head which is smaller and lighter in weight than conventional optical heads.

It is a further object of this invention to provide such a holographic head which can also correct for aberrations in associated collimating and objective elements.

A still further object of this invention is to provide such a holographic head which accommodates inexpensive collimating and objective elements.

The invention results from the realization that a truly effective optical read/write head which corrects beam ellipticity in addition to compensating for dispersion can be achieved by inclining first and second hologram elements relative to each other to magnify the narrower of the cross-sectional dimensions of the beam and to pass the beam substantially circular in cross section.

This invention features a holographic head including a collimating element for receiving a quasi-coherent beam of radiation non-circular in cross section, an objective element for receiving a radiation beam and focusing it to a spot, and a holographic unit disposed between the collimating and objective elements. The holographic unit includes a first hologram element for receiving the beam from the collimating element, the beam exiting the first hologram element at a predetermined diffractive order and sign, and a second hologram element inclined at an angle to the first hologram element for providing to the objective element a beam substantially circular in cross section and at the same diffractive order and opposite sign to compensate for dispersion.

In one embodiment, the first hologram element receives the beam at an angle other than normal to it. The angle may be an acute angle, and the first hologram element is aligned relative to the collimating element to reduce the ellipticity of the beam. The first and second hologram elements are aligned relative to the collimating element and to each other to differentially magnify the cross-sectional dimensions of the beam and may magnify substantially only the narrower of the cross-sectional dimensions. The first hologram element may further compensate for aberrations of the collimating element and the second hologram may compensate for aberrations of the objective element.

In another embodiment, the first hologram element includes a substrate having substantially parallel surfaces and a first hologram disposed on the exiting surface of the substrate, and the second hologram element includes a substrate having substantially parallel surfaces and a second hologram disposed on the incident surface of that substrate. The first and second holograms may face each other. The quasi-coherent beam is a laser beam transiting the holographic elements and may not be fully collimated at any point, but the beam exits the first hologram at an angle substantially normal to it and the beam exits the second hologram at an angle substantially normal to it.

This invention also features a holographic head including a collimating element, an objective element, a holographic unit having first and second hologram elements, beam splitter means disposed between the first and second hologram elements, a quarter-wave plate disposed between the beam splitter means and the spot to which the beam is focused by the objective element, and a third hologram element offset from the first hologram element. The beam splitter means directs to the third hologram element radiation returned through the objective element, the quarter-wave plate, and the second hologram element.

DISCLOSURE OF PREFERRED EMBODIMENT

Other objects, features and advantages will occur from the following description of a preferred embodiment and the accompanying drawings, in which.

This invention may be accomplished by positioning a holographic unit relative to a collimating element and an objective element. The holographic unit includes a first hologram which receives a beam non-circular in cross section and diffracts the beam into a predetermined order and sign. The unit further includes a second hologram inclined at an angle to the first hologram for providing the beam circular in cross section and of the same order and opposite sign. The second hologram corrects for dispersion of the beam introduced by the first hologram, and the first hologram, the second hologram, or both correct beam ellipticity. The first hologram corrects for aberrations introduced by the collimating element and the second hologram corrects for aberrations introduced by the objective element.

Figure 1:
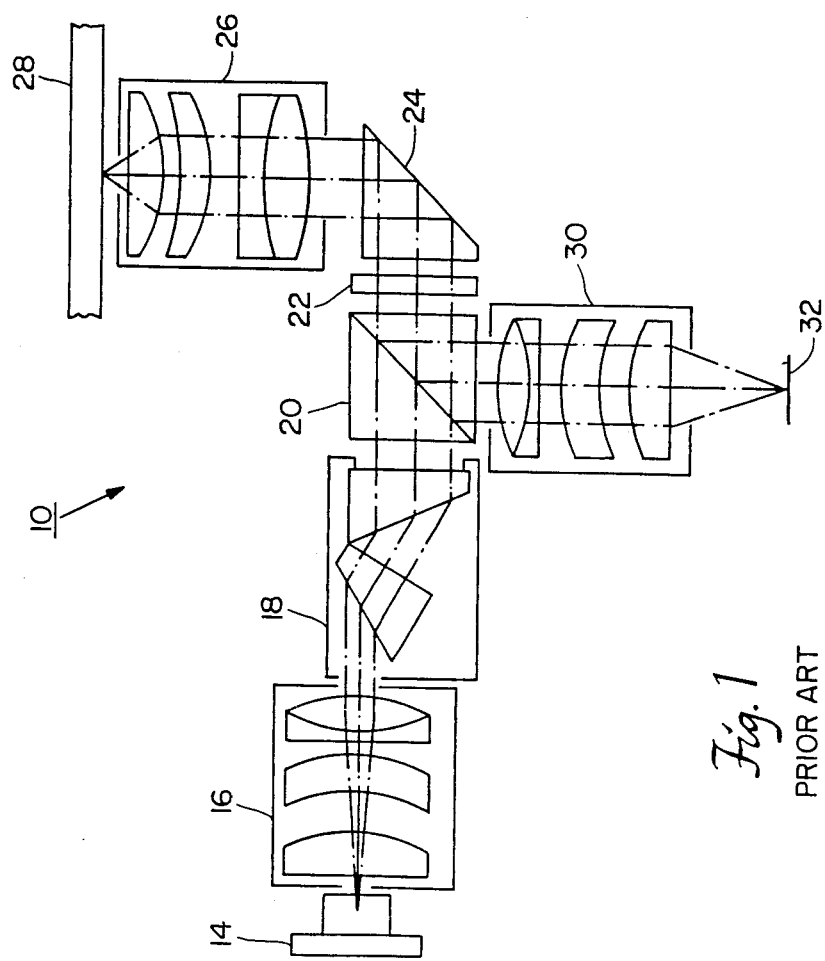
FIG. 1 is a schematic diagram of a conventional optical head.
Figure 2:
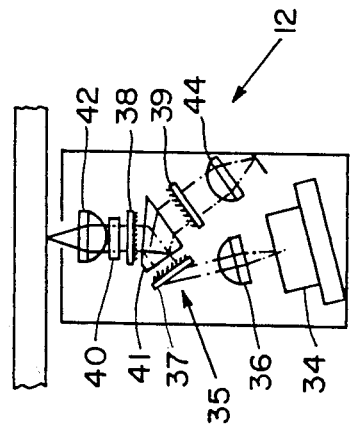
FIG. 2 is a schematic diagram of a holographic head according to this invention at a scale similar to that of FIG. 1.

A comparison of the functions and relative sizes of the elements of conventional optical head 10 and holographic head 12 according to this invention are provided in FIGS. 1 and 2. Conventional read/write head 10 includes diode laser 14, collimator unit 16, prism beam shaper 18, polarizing beam splitter 20, retardation plate 22 such as a quarter-wave plate, turning prism 24, and objective unit 26. After striking surface 28, the beam returns through objective unit 26 and turning prism 24. The polarized beam is retarded again by element 22 to a polarization which is reflected by beam splitter 20. The reflected beam passes through re-imaging unit 30 where it is focused to detector focal plane 32. Each unit may include as many as three or five glass lenses which are largely responsible for the heavy weight and high cost of conventional head 10.

In contrast, holographic head 12 according to this invention utilizes a similar diode laser 34 yet is far smaller and lighter than conventional head 10. Holographic head 12 includes inexpensive collimating element 36, holographic unit 35 with hologram elements 37, 38 and 39, polarizing beam splitter 41, retardation plate 40, objective element 42, and re-imaging element 44. Elements 36, 42, and 44 can be inexpensive plastic lenses whose aberrations are compensated by the holograms of holographic unit 35. Laser 34 emits quasi-coherent radiation. The term "quasi-coherent" includes coherent and nearly coherent radiation such as that emitted by semi-conductor lasers.

Figure 3A:
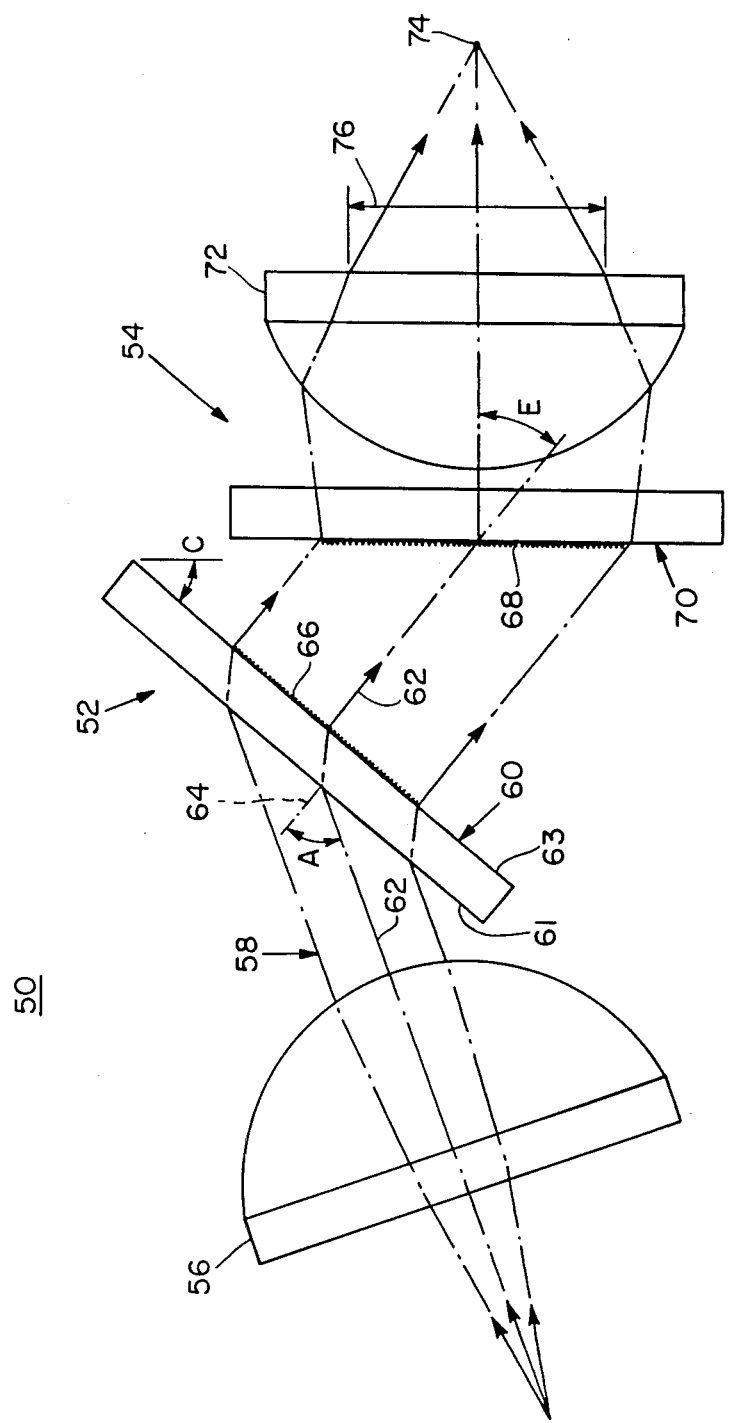
FIG. 3A is a simplified representation of a greatly enlarged schematic diagram of another holographic head according to this invention.

Holographic head 50 according to this invention, FIG. 3A, includes first hologram element 52 and second hologram element 54 inclined relative to each other and to collimating lens 56. Lens 56 is a quasi-collimating unit which establishes beam 58 as slightly divergent or convergent along one or more cross-sectional dimensions. Substrate 60 has an incident surface 61 and an exit surface 63 which are planar and substantially parallel to each other. Beam 58 is incident upon substrate 60 at angle A, measured from chief ray 62 to dashed line 64 which is normal to substrate 60. Beam 58 is refracted as it passes through substrate 60, and then is diffracted by hologram 66 which is disposed on the opposite, exit surface 63 of substrate 60.

Chief ray 62 emerges substantially normal to hologram 66. Moreover, hologram 66 and hologram 68, disposed on the incident surface of substrate 70, correct for aberrations in collimating lens 56 and objective lens 72, respectively, by introducing compensating wave front distortions into beam 58. Correction of lens aberrations using holograms is known in the art. Beam 58 is diffracted and refracted by angle E at the same diffractive order but opposite sign so that chief ray 62 emerges substantially normal from second hologram element 68. Beam 58 is overall slightly diverging, and then is focused by objective lens 72 to spot 74. In this construction, substrates 60, 70 are each approximately 0.5 mm in thickness and are made of BK7 glass. Objective lens 72 is spaced approximately 0.2 mm from substrate 70, spot 74 is approximately 2.27 mm from the end of objective lens 72 and exit pupil 76 is 2.3 mm. Further, angle A is approximately 54.7 degrees, angle C is approximately 39.4 degrees, and angle E is approximately 39.4 degrees. Holographic optical head 50 is designed for use with diode laser models number 3101/3104 from Mitsubishi, and collimating lens 56 and objective element 72 are model number 01LPX421 available from the Melles-Griot Company. To utilize a return beam, a beam splitter and retardation plate similar to those of FIGS. 1 and 2 are employed.

The angle A at which beam 58 from collimating element 56 is incident upon first hologram element 52, and the angle C between second hologram element 54 and first hologram element 52 differentially magnify the cross-sectional dimensions of beam 58. Magnification of the narrower dimension of the beam provides energy-efficient correction of beam shape. The selection of the parameters for a holographic head according to this invention are described generally in relation to FIGS. 3B–3D for holographic head 50a. The configuration of holographic head 50 is determined primarily by the predetermined amount of ellipticity to be removed from beam 58a. Further, it is desirable that chief ray 62a be normal during exit from each hologram 66a, 68a. While most dispersion compensation is provided by the diffraction of beam 58a in opposite orders, e.g. +1.0 order and −1.0 order, small transverse displacements of beam 58a may also occur during dispersion. Establishing the chief ray as normal to the holograms ensures that dispersion near the chief ray is symmetric with deviation from the designed wavelength.

Figure 3D:
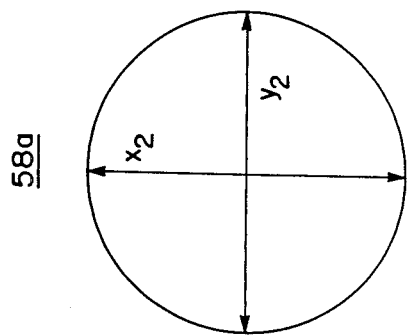
FIG. 3D is a diagram of the aspect ratio of the beam after it exits the holographic head of FIG. 3B.
Figure 3B:
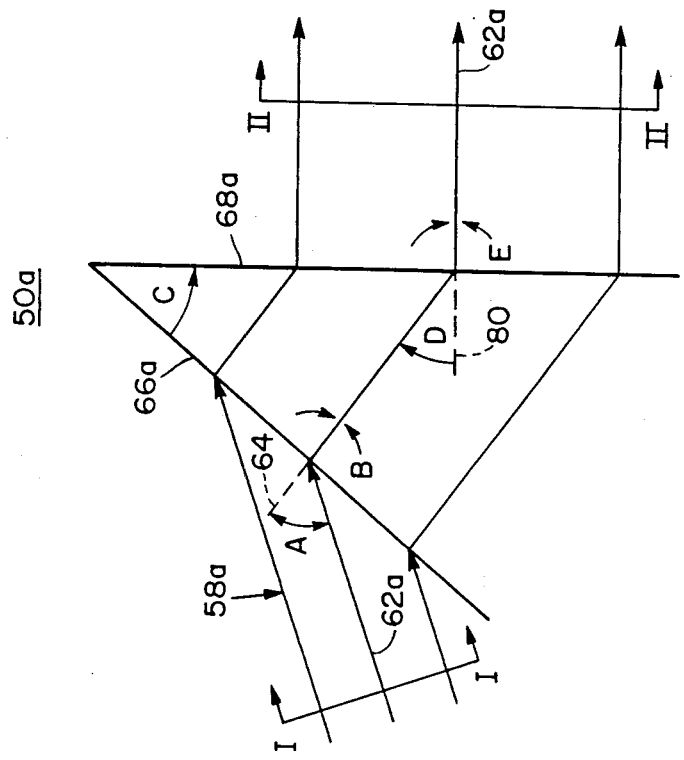
FIG. 3B is a further simplified representation of the holographic head of FIG. 3A passing a collimated beam.
Figure 3C:
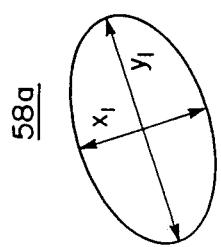
FIG. 3C is a diagram of the aspect ratio of the beam before it enters the holographic head of FIG. 3B.

Beam 58a is shown in cross-section along lines I—I in FIG. 3C to illustrate its ellipticity. Narrow cross-sectional dimension $x_1$ is much shorter than dimension $y_1$, typically having a 2.6:1 aspect ratio. After passing through holographic unit 50a, height dimension $x_1$ is greatly enlarged to dimension $x_2$, which is substantially equal to $y_1$ as show in FIGS. 3C and 3D. FIG. 3D represents a view along lines II—II of FIG. 3B. In this construction the width of beam 58 is not magnified so that $y_2$ is equal to $y_1$.

To demonstrate the design principles for these holographic units for the simple case shown in FIG. 3B, beam 58a is collimated throughout and no changes in indices of refraction are shown. In practice, beam 58a will be somewhat diverging with different divergences in the X and Y directions shown in FIG. 3C; appropriate compensation would be made for these effects. Further, holograms 66a, 68a are assumed to be constant frequency diffraction gratings. Incident angles are measured counterclockwise from normal, such as angle A measured from normal 64 to chief ray 62a. Exit angles are measured clockwise from normal. These conventions result in the angle C between holograms 66a, 68a being the negative of the sum of the first hologram exit angle B and the second hologram angle of incidence D, measured from normal 80, as shown by equation (1):

$$C = -(B+D) \tag{1}$$

The total magnification M for holographic unit 50a is selected to remove a predetermined amount of ellipticity and its associated azimuthally varying divergence of beam 58a. Magnification M is given by the formula $$M = (\cos B/\cos A)(\cos E/\cos D) \tag{2}$$

Exit angles B, E are selected as zero relative to normal reference lines 64, 80 to maximize the magnification of each hologram for any given entrance angle, and to minimize beam displacement due to dispersion as described above. Dispersion compensation is provided by designing hologram 66a to diffract beam 58a at an order of 1.0 and designing hologram 68a to diffract at $-1.0$ order. The two orders of diffraction need not be unity, but it is desirable that they sum to zero. It is also desirable that magnification M be accomplished substantially equally by holograms 66a, 68a, with the individual hologram magnifications adjusted to maximize dispersion compensation while maintaining a predetermined maximum focal spot size over the entire range of dispersion correction.

Given the requirements stated above, the configuration of holographic unit 50a is as follows. Since it is desirable that exit angles B, E are normal to their respective holograms, both angles are equal to zero. To achieve equal hologram magnification, incident angle A is equal to the absolute value of incident angle D; to satisfy equation (1), angle A is equal to the negative of angle D. The value of angles A, D are, to first order, determined by the inverse of the square root of magnification M. The value for angle C is determined by equation (1).

The dimensions of holographic head 50 differ from the ideal case for several reasons. Hologram 68 was constructed to pass a non-collimated beam to assist correction for lens-induced aberrations. Adequate numerical aperture and dispersion compensation were provided by altering angle C to adjust the magnification. Selection of the objective numerical aperture determines the diameter of beam 58 at exit pupil 76. In order to provide a spot no larger than the predetermined value, the numerical aperture must exceed or equal a calculated value as is within the skill of the art. Further, all ellipticity need not be removed from beam 58 when some amount of ellipticity leads to more desirable spot sizes at the extremes of the dispersion compensated wavelength spectra.

Figure 4:
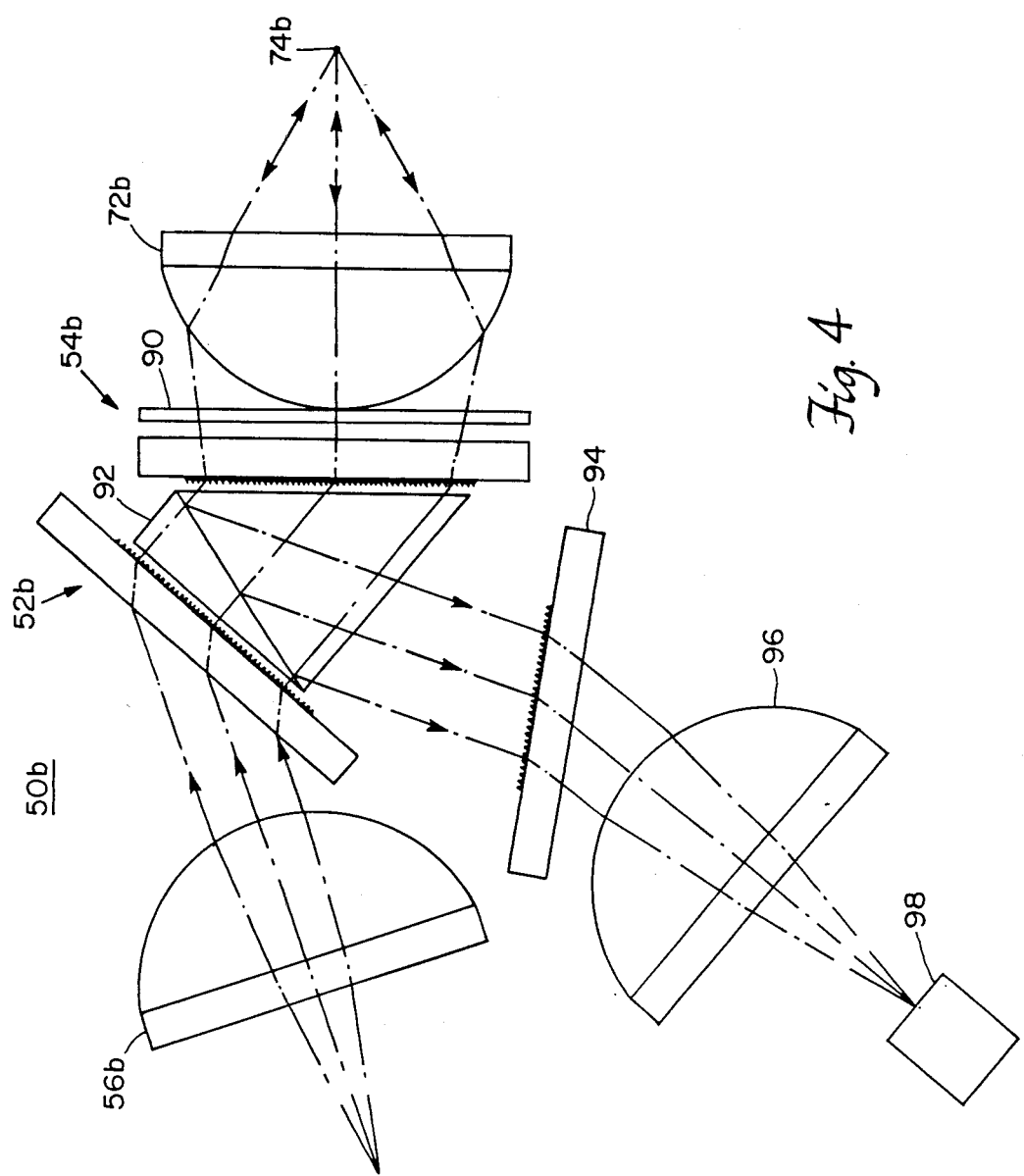
FIG. 4 is a more detailed diagram of a read/write holographic head according to this invention.

Holographic head 50b according to this invention, FIG. 4, includes quasi-collimating element 56b, first hologram element 52b, second hologram element 54b, and objective element 72b. In addition, holographic head 50b includes quarter-wave plate 90, beam splitter cube 92, third hologram element 94, re-imaging element 96, and detector 98. After being focussed to spot 74b, the beam is redirected by beam splitter 92 to serve as a tracking, focussing and read beam. Hologram element 94 diffracts the beam at the same order and opposite sign relative to hologram element 54b to provide dispersion compensation, aberration correction for focussing element 96 and ellipticity correction as needed. Quarter-wave plate 90 may serve as the substrate for the second hologram of element 54b.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A holographic head comprising:
 a collimating element for receiving a quasi-coherent beam of radiation non-circular in cross section;
 an objective element for receiving a radiation beam and focussing it to a spot; and
 a holographic unit disposed between said collimating element and objective element and including a first hologram element for receiving the beam from said collimating element, the beam exiting said first hologram element at a predetermined diffractive order and sign, and a second hologram element inclined at an angle to said first hologram element for providing to said objective element a beam substantially circular in cross section and at the same diffractive order and opposite sign to compensate for dispersion.

2. The holographic head of claim 1 in which said first hologram element receives the beam at an angle other than normal to it.

3. The holographic head of claim 1 in which said first hologram element receives the beam at an acute angle.

4. The holographic head of claim 1 in which said first hologram element is aligned relative to said collimating element to reduce the ellipticity of the beam.

5. The holographic head of claim 1 in which said first and second hologram elements are aligned relative to said collimating element and to each other to differentially magnify the cross-sectional dimensions of the beam.

6. The holographic head of claim 5 in which said first and second hologram elements are aligned to magnify substantially only the narrower of the cross-sectional dimensions of the beam.

7. The holographic head of claim 1 in which said first hologram element is constructed to compensate for aberrations of said collimating element.

8. The holographic head of claim 1 in which said first hologram element includes a substrate having substantially parallel surfaces and a first hologram disposed on the exit surface of said substrate.

9. The holographic head of claim 8 in which said second hologram element includes a substrate having substantially parallel surfaces and a second hologram disposed on the incident surface of said substrate.

10. The holographic head of claim 9 in which said first and second holograms face each other.

11. The holographic head of claim 1 in which said second hologram element is constructed to compensate for aberrations of said objective element.

12. The holographic head of claim 1 in which said second hologram element produces an exit beam which is not fully collimated.

13. The holographic head of claim 1 in which the holographic head is constructed to transmit the beam as not fully collimated at any point along its path.

14. The holographic head of claim 1 in which the beam exits said first hologram at an angle substantially normal to it.

15. The holographic head of claim 1 in which the beam exits said second hologram at an angle substantially normal to it.

16. The holographic head of claim 1 in which the quasi-coherent beam is a laser beam.

17. The holographic head of claim 1 further including a quarter-wave plate disposed between said second hologram element and said objective element.

18. The holographic head of claim 17 further including: a third hologram element offset from said first hologram element; and beam splitter means, disposed between said first and second hologram elements, for directing to said third hologram element radiation returned through said objective element, said quarter-wave plate, and said second hologram element.

19. A holographic head comprising:
a collimating element for receiving a quasi-coherent beam of radiation non-circular in cross section;
an objective element for receiving a radiation beam and focussing it to a spot; and
a holographic unit disposed between said collimating element and objective element and including a first hologram element for receiving the beam at an acute angle from said collimating element to reduce the ellipticity of the beam, the beam exiting said first hologram element at a predetermined diffractive order and sign, and a second hologram element inclined at an angle to said first hologram element for providing to said objective element a beam substantially circular in cross section and at the same diffractive order and opposite sign to compensate for dispersion.

20. The holographic head of claim 19 in which said first and second hologram elements are aligned relative to said collimating element and to each other to differentially magnify the cross-sectional dimensions of the beam.

21. The holographic head of claim 19 in which said first and second hologram elements, respectively, are constructed to compensate for aberrations of said collimating element or said objective element.

22. A holographic head comprising:
a collimating element for receiving a quasi-coherent beam of radiation non-circular in cross section;
an objective element for receiving a radiation beam and focussing it to a spot;
a holographic unit disposed between said collimating element element and objective element and including a first hologram element for receiving the beam from said collimating element, the beam exiting said first hologram element at a predetermined diffractive order and sign, and a second hologram element inclined at an angle to said first hologram element for providing to said objective element a beam substantially circular in cross section and at the same diffractive order and opposite sign;
beam splitter means disposed between said first and second hologram elements;
a quarter-wave plate disposed between said beam splitter means and the spot;
a third hologram element offset from said first hologram element; and
said beam splitter means directing to said third hologram element radiation returned through said objective element, said quarter-wave plate, and said second hologram element.

23. The holographic head of claim 22 in which said quarter-wave plate is disposed between said second hologram element and said objective element.

24. The holographic head of claim 22 in which said first and second hologram elements, respectively, are constructed to compensate for aberrations of said collimating element or said objective element.

25. A holographic head comprising:
a collimating element for receiving a quasi-coherent beam of radiation non-circular in cross section;
an objective element for receiving a radiation beam and focussing it to a spot; and
a holographic unit disposed in the path of the beam and including a first hologram element for receiving the beam at an angle other than normal to it, the beam exiting said first hologram element at a predetermined diffractive order and sign, and a second hologram element inclined at an angle to said first hologram element for providing a beam circular in cross section and at the same diffractive order and opposite sign to compensate for dispersion.

* * * * *